Patented Sept. 22, 1942

2,296,284

UNITED STATES PATENT OFFICE 2,296,284

METHOD FOR PREPARING MATERIAL HAVING THE PHYSIOLOGICAL ACTIVITY OF THE CORPUS LUTEUM HORMONE

Percy L. Julian, Maywood, and John Wayne Cole, Chicago, Ill., assignors to The Glidden Company, Cleveland, Ohio, a corporation of Ohio No Drawing. Application April 16, 1941,
Serial No. 388,901

10 Claims. (Cl. 260—397.3)

The present invention relates to an improved method for the synthesis of material having the physiological activity of the corpus luteum hormone.

The object of the present invention is to provide a new method for the synthesis of material having the physiological activity of the corpus luteum hormone, from raw materials more readily available and more easily purified than those formerly used for this purpose.

Shortly after the isolation of the crystalline active principle of the corpus luteum by Allen (Am. J. Physiol. 98, 591 (1932)) and its chemical characterization by Slotta, Ruschig and Fels (Ber. 67, 1270, (1934)), synthetic preparations were advanced by Fernholz (Ber. 67, 1855, (1934)) and by Butenandt, Westphal and Heinz (Ber. 67, 1611 (1934)). These synthetic preparations were made possible by Fernholz's discovery that the acetate of stigmasterol (from soybean oil) yielded 3-acetoxy-bisnorcholenic acid when subjected to ozonization. The next step in the characterization of such an acid was to degrade it by the classical Barbier-Wieland method (Gilman, "Organic Chemistry," col. II, p. 1240, John Wiley and Sons, New York, 1938) and Fernholz carried out this degradation. Butenandt also, utilizing Fernholz's new discovery carried out the same degradation.

These workers both obtained from this degradation of $\Delta^5$-3-acetoxy-bisnorcholenic acid, pregnenolone of the structure shown in Formula I, and both likewise converted this pregnenolone in $\Delta^4$-pregnendione-3,20 (Formula II), the corpus luteum hormone.

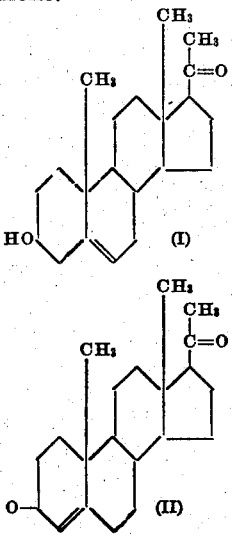

The active hormone (Formula II) was secured by a process which oxidized the hydroxyl group to a keto group, the double bond shifting to the more stable conjugated system.

In studying this earlier work, we have found that pregnenolone (I) is secured in meager yield, considering the cost of starting material, and its isolation as pure crystals is accompanied by considerable loss, less than 25% by weight of the original bisnorcholenic acid being recovered as pure pregnenolone. Many factors account for this. First of all, the first intermediate in the degradation of $\Delta^5$-3-acetoxy-bisnorcholenic acid as carried out by Fernholz and Butenandt, namely the $\Delta^5$-3-hydroxy-ternorcholenyl diphenyl carbinol, is secured in a yield usually of less than 60% of the theoretical when the reaction is carried out according to the customary Barbier-Wieland procedure. Secondly, the usual procedure for converting the ester of bisnorcholenic acid into the corresponding tertiary carbinol demands considerable excess and high concentration of the Grignard reagent, as well as relatively high temperatures. These all favor reductive action on the part of the Grignard reagent, thus contaminating the end product to quite an extent. Thirdly, as we have shown in application Serial No. 388,899, filed Apr. 16, 1941, the second intermediate in the Barbier-Wieland degradation of the bisnorcholenic acid, namely, the 1,1-diphenyl-2-methyl-2 ($\Delta^5$-3-acetoxy-cholenyl) ethylene melts and mixed melts dangerously close to the melting point of $\Delta^5$-3-acetoxy-ternorcholenyl phenyl ketone, a product which might easily be a by-product of the reaction between the ester of the bisnorcholenic acid and phenyl magnesium bromide. Thus the ethylene may be contaminated without ready detection and the yield of pure pregnenolone as well as its obtention in pure form will be adversely affected. Moreover, in the ozonization of the acetoxy-ethylene, the pure dibromide is not usually isolated and the uncertainties of correct bromination at this stage, combined with the hydrolytic and oxidative decompositions taking place on working up the ozonide, all tend to lower the yield of pure pregnenolone.

We have discovered that material having the physiological activity of the corpus luteum hormone, $\Delta^4$-pregnendione,3-20, may be prepared in a manner which obviates most of the difficulties mentioned above. This method does not employ pregnenolone at all, but makes use of the readily available, readily crystallizing, and easily purifiable unsaturated keto-ethylenes of the Formula III wherein R represents a hydrocarbon radical such as phenyl or methyl. These keto-ethylenes may be prepared, for example, by subjecting hydroxy-ethylenes of the formula

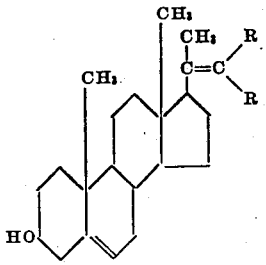

in which R is a hydrocarbon radical to the action of an aluminum alcoholate in the presence of a ketone solvent, such as cyclohexanone for example

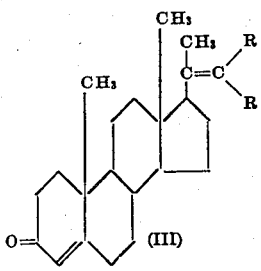

One of the ways in which the active material of the present invention may be prepared from the ketone (III) is by partial ozonization. During such ozonization of the free keto-ethylene (III) there is, of course, some loss occasioned by rupture of the bond at the 4,5-position as well as at the 20—22 position giving rise to certain by-products. These by-products are acids, however, which are readily separated from the principal product, and the yield of fairly pure corpus luteum hormone is surprisingly good.

A modification of this synthesis and one which yields the pure corpus luteum hormone in excellent yield consists in ozonization of 3-keto-5,6-dibromoetiocholanyl - methyl - diphenyl ethylene (Formula IV), a compound which may be obtained pure and in excellent yield by procedures described in copending application Serial No. 388,900 filed April 16, 1941 (Case C), followed by removal of bromine with a suitable debrominating agent such as zinc and acetic acid.

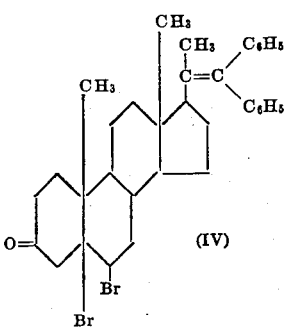

This treatment is known to cause nuclear bonds to assume the more stable conjugated configuration as shown in Formula II.

The advantages of this method for the preparation of the physiological active material over previously suggested ones lie, in part at least, in the ease which the starting materials are obtained and purified.

Still another modification of the synthesis has been carried out. Ozone was passed into a solution of the keto-ethylene (V),

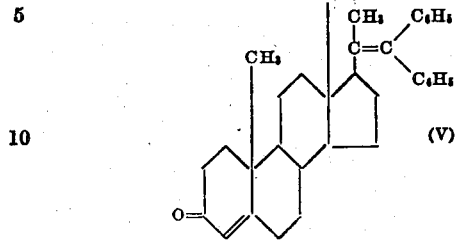

to which has been added one molar equivalent of bromine, followed by decomposition of the ozonide and debromination with zinc dust and acetic acid. This also gives rise to a fair yield of active material but the preparation is not as pure as that described above, since bromination of (V) gives rise to substitution as well as addition products, evidenced by evolution of considerable quantities of hydrogen bromide and difficulty in isolation of the pure crystalline addition product.

The following examples serve to illustrate the invention:

EXAMPLE 1.—*Ozonization of the diphenyl keto-ethylene (V)*

One gram of 1,1-diphenyl-2-methyl-2 ($\Delta^4$,-3-keto-etio-cholenyl) ethylene (V) was dissolved in 200 cc. of chloroform, cooled to 0° in an ice-salt bath, and treated with a standardized stream of ozone for two minutes. The resulting material was steam distilled for 20 minutes, thus decomposing the ozonide, removing the chloroform and some benzophenone and leaving behind a colorless, semi-crystalline residue. When shaken with ether, the major portion of the residue dissolved and was separated from crystals which remained undissolved. These latter were shown to be unchanged keto-ethylene. The ether solution after washing with sodium carbonate solution and water, was concentrated to a wax-like product. This product exhibited the physiological properties of the corpus luteum hormone and the biological assay indicated a 40% yield, based on the keto-ethylene employed.

EXAMPLE 2.—*Ozonization of the dimethyl keto ethylene (III) (R–CH3)*

When 1,1 - dimethyl - 2 - methyl-2 ($\Delta^4$-3-keto-etio-cholenyl) ethylene (III), is treated exactly as in Example 1, a similar product is obtained as in Example 1 in about the same yield.

EXAMPLE 3.—*Ozonization of the 5-6-dibromo-keto-ethylene (IV)*

A solution of 2 grams of 3-keto-5,6-dibromo-etio-cholenyl-methyl-diphenyl-ethylene (Formula IV) in 200 cc. of chloroform is cooled to 0° C. and treated with a standardized solution of ozone for about fifteen minutes. It is then steam distilled until no more chloroform remains. The residue is dissolved in ether, 15 cc. of acetic acid and 2 g. of zinc dust are added, and the mixture is stirred for 20 minutes. The ether solution is decanted from the unchanged zinc, and washed with water, sodium carbonate solution, and again with water. Evaporation of the ether leaves a product similar to the product of Example 1. This product may be purified by the various methods already described in the literature and converted into the crystalline corpus luteum hormone.

Variations of the above experiments are also a part of this invention. For example, instead of chloroform one may use any of numerous other solvents as described in the chemical literature for use with ozone. Instead of ozonized-oxygen one may use ozonized air. The zinc dust and acetic acid of Example 3 may be replaced by other debrominating reagents such as sodium iodide. Also it will be understood by those skilled in the art that ketones of the type represented by formula III or the corresponding 5-6-dibrom compound may be employed in which substituents represented by R may be different hydrocarbon groups or hydrogen atoms.

Having described the invention, what we claim is:

1. The process for preparing a material having the physiological properties of the corpus luteum hormone which comprises subjecting a keto-ethylene of the formula

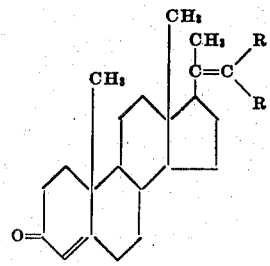

wherein R represents a hydrocarbon radical, to the action of ozone, followed by decomposition of the ozonide, and separating the products so formed.

2. The process for preparing a material having the physiological properties of the corpus luteum hormone which comprises subjecting 1,1 - diphenyl - 2-methyl-2($\Delta^4$-3-keto-etio-cholenyl) ethylene of melting point about 229° C. to the action of ozone, followed by decomposition of the ozonide, and separating the products so formed.

3. The process for preparing a material having the physiological properties of the lutem hormone which comprises subjecting 1,1-dimethyl - 2 - methyl-2($\Delta^4$-3-keto-etio-cholenyl) ethylene, of melting point about 194° C. to the action of ozone, followed by decomposition of the ozonide, and separating the products formed.

4. The process for preparing $\Delta^4$-pregnendione-3,20, the corpus luteum hormone which comprises subjecting a ketone of the general formula

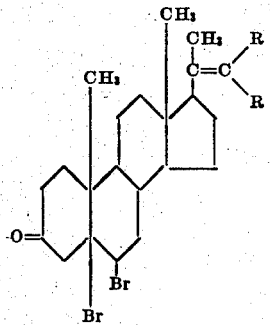

wherein R represents a hydrocarbon radical, to the action of ozone, followed by decomposition of the ozonide and removal of bromine, and separating the products so formed.

5. The process for preparing $\Delta^4$-pregnendione-3,20, the corpus luteum hormone which comprises subjecting a ketone of the formula

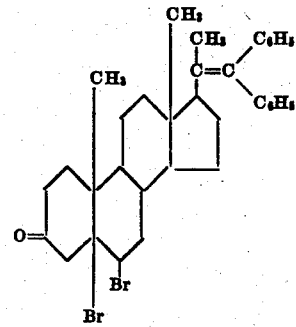

to the action of ozone, followed by decomposition of the ozonide and removal of the bromine with zinc dust and acetic acid, and separating the products so formed.

6. The process of preparing a substance having the physiological properties of the corpus luteum hormone which comprises subjecting a keto-ethylene selected from the class consisting of 2-methyl-2($\Delta^4$-3-keto-etio-cholenyl) ethylenes and 2-methyl-2(3-keto-5-6-dibromo-etio-cholanyl) ethylenes to the action of an oxidizing agent to split the ethylenic linkage and convert it to a keto group, and separating the products so formed.

7. The process for preparing a material having the physiological properties of the corpus luteum hormone which comprises subjecting a keto-ethylene of the formula

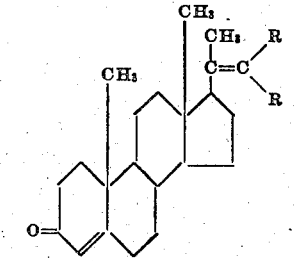

wherein R represents a hydrocarbon radical, to the action of an oxidizing agent to split the ethylenic linkage and convert it to a keto group, followed by separation of the products so obtained.

8. The process of preparing a material having the physiological properties of the corpus luteum hormone which comprises subjecting a dibromo-keto-ethylene of the general formula

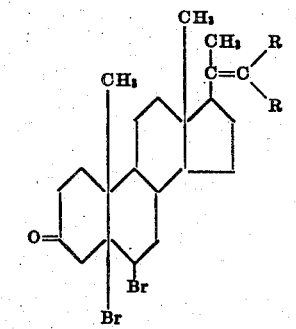

wherein R represents a hydrocarbon radical, to the action of an oxidizing agent, to split the ethylenic linkage and convert it to a keto group followed by removal of the bromine, and separation of the products so obtained.

9. In a process for preparing a material having the physiological properties of the corpus luteum hormone comprising subjecting a keto-ethylene selected from the class consisting of those having the formulae

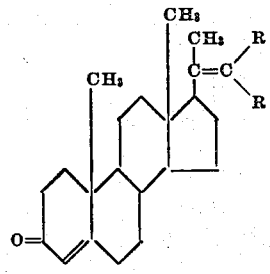

and

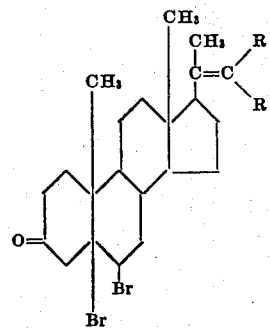

in which R represents a hydrocarbon radical, to the action of an oxidizing agent to split the ethylenic linkage and convert it to a keto group.

10. In a process for preparing a material having the physiological properties of the corpus luteum hormone the steps comprising subjecting a keto-ethylene selected from the class consisting of those having the formulae

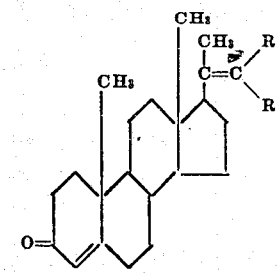

and

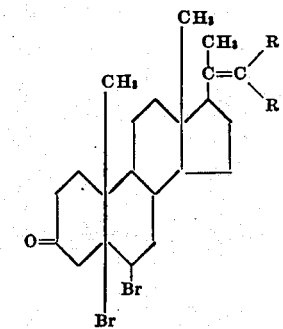

in which R represents a hydrocarbon radical to the action of ozone, followed by decomposition of the ozonide thus formed.

PERCY L. JULIAN.
JOHN WAYNE COLE.